United States Patent
Huang et al.

(10) Patent No.: US 10,823,572 B2
(45) Date of Patent: Nov. 3, 2020

(54) METHOD, SYSTEM AND APPARATUS FOR GENERATING NAVIGATIONAL DATA

(71) Applicant: SYMBOL TECHNOLOGIES, LLC, Lincolnshire, IL (US)

(72) Inventors: Zichen Huang, Richmond Hill (CA); Harsoveet Singh, Mississauga (CA); Sadegh Tajeddin, Mississauga (CA); Stephen L. Smith, Kitchener (CA)

(73) Assignee: Symbol Technologies, LLC, Holtsville, NY (US)

( * ) Notice: Subject to any disclaimer, the term of this patent is extended or adjusted under 35 U.S.C. 154(b) by 17 days.

(21) Appl. No.: 15/946,294

(22) Filed: Apr. 5, 2018

(65) Prior Publication Data
US 2019/0310090 A1   Oct. 10, 2019

(51) Int. Cl.
| | | |
|---|---|---|
| *G01C 21/20* | (2006.01) | |
| *G05D 1/00* | (2006.01) | |
| *G06Q 10/08* | (2012.01) | |
| *G06F 16/29* | (2019.01) | |

(52) U.S. Cl.
CPC ......... *G01C 21/206* (2013.01); *G05D 1/0088* (2013.01); *G06F 16/29* (2019.01); *G06Q 10/087* (2013.01)

(58) Field of Classification Search
None
See application file for complete search history.

(56) References Cited

U.S. PATENT DOCUMENTS

| | | |
|---|---|---|
| 5,209,712 A | 5/1993 | Ferri |
| 5,214,615 A | 5/1993 | Bauer |
| 5,408,322 A | 4/1995 | Hsu et al. |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

Golovinskiy, Aleksey, et al. "Min-Cut based segmentation of point clouds." Computer Vision Workshops (ICCV Workshops), 2009 IEEE 12th International Conference on. IEEE, 2009.

(Continued)

*Primary Examiner* — Thomas G Black
*Assistant Examiner* — Demetra R Smith-Stewart

(57) ABSTRACT

A computing device for generating a navigational path for a mobile automation apparatus includes: a memory storing, for each of a plurality of pairs of poses having predetermined orientations, a group of pre-computed path segments, each path segment traversing the pair of poses and corresponding to one of a set of entry poses and one of a set of exit poses; a navigational controller configured to: obtain a coarse path defined by a sequence of guide poses each having one of the predetermined orientations, the coarse path having a start location and an end location; for each successive pair of the guide poses, retrieve a selected one of the path segments from memory based on orientations of (i) the pair of guide poses, (ii) a preceding guide pose, and (iii) a following guide pose; and generate a final path for navigation by the apparatus by combining the selected path segments.

16 Claims, 10 Drawing Sheets

(56) References Cited

U.S. PATENT DOCUMENTS

| | | |
|---|---|---|
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,418,560 B1 * | 8/2016 | Rosenwald ............ G08G 5/003 |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,980,009 B2 | 5/2018 | Jiang et al. |
| 9,994,339 B2 | 6/2018 | Colson et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,394,244 B2 | 8/2019 | Song et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0131278 A1 | 7/2004 | imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2007/0276709 A1 * | 11/2007 | Trimby ................... A63F 13/00 705/6 |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |

(56) References Cited

U.S. PATENT DOCUMENTS

| | | |
|---|---|---|
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0022304 A1* | 1/2011 | Lee .............. G01C 21/3423 701/533 |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volkmann et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |

(56) References Cited

U.S. PATENT DOCUMENTS

| | | | |
|---|---|---|---|
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0253735 A1 | 9/2016 | Scudillo et al. |
| 2016/0253844 A1 | 9/2016 | Petrovskaya et al. |
| 2016/0271795 A1 | 9/2016 | Vicenti |
| 2016/0313133 A1 | 10/2016 | Zang et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0066459 A1 | 3/2017 | Singh |
| 2017/0074659 A1 | 3/2017 | Giurgiu et al. |
| 2017/0150129 A1 | 5/2017 | Pangrazio |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323376 A1 | 11/2017 | Glaser et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0059628 A1* | 3/2018 | Yoshida ............ G05B 1/01 |
| 2018/0101813 A1 | 4/2018 | Paat et al. |
| 2018/0114183 A1 | 4/2018 | Howell |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0281191 A1 | 10/2018 | Sinyavskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0180150 A1 | 6/2019 | Taylor et al. |
| 2019/0197728 A1 | 6/2019 | Yamao |
| 2019/0392212 A1 | 12/2019 | Sawhney et al. |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2019023249 | 1/2019 |

OTHER PUBLICATIONS

Hackel et al., "Contour Detection in unstructured 3D point clouds,"IEEE, 2016 Conference on Computer vision and Pattern recognition (CVPR), Jun. 27-30, 2016, pp. 1-9.

Hao et al., "Structure-based object detection from scene point clouds," Science Direct, v191, pp. 148-160 (2016).

Hu et al., "An improved method of discrete point cloud filtering based on complex environment," International Journal of Applied Mathematics and Statistics, v48, i18 (2013).

International Search Report and Written Opinion for corresponding International Patent Application No. PCT/US2016/064110 dated Mar. 20, 2017.

International Search Report and Written Opinion for corresponding International Patent Application No. PCT/US2017/024847 dated Jul. 7, 2017.

International Search Report and Written Opinion for International Application No. PCT/US2019/025859 dated Jul. 3, 2019.

International Search Report and Written Opinion from International Patent Application No. PCT/US2018/030345 dated Sep. 17, 2018.

International Search Report and Written Opinion from International Patent Application No. PCT/US2018/030360 dated Jul. 9, 2018.

International Search Report and Written Opinion from International Patent Application No. PCT/US2018/030363 dated Jul. 9, 2018.

International Search Report and Written Opinion from International Patent Application No. PCT/US2019/025849 dated Jul. 9, 2019.

International Search Report and Written Opinion from International Patent Application No. PCT/US2019/064020 dated Feb. 19, 2020.

International Search Report and Written Opinion for International Patent Application No. PCT/US2013/053212 dated Dec. 1, 2014.

International Search Report and Written Opinion for International Patent Application No. PCT/US2013/070996 dated Apr. 2, 2014.

Jadhav et al. "Survey on Spatial Domain dynamic template matching technique for scanning linear barcode," International Journal of scieve and research v 5 n 3, Mar. 2016)(Year: 2016).

Jian Fan et al: "Shelf detection via vanishing point and radial projection", 2014 IEEE International Conference on image processing (ICIP), IEEE, (Oct. 27, 2014), pp. 1575-1578.

Kang et al., "Kinematic Path-Tracking of Mobile Robot Using Iterative learning Control", Journal of Robotic Systems, 2005, pp. 111-121.

Kay et al. "Ray Tracing Complex Scenes." ACM SIGGRAPH Computer Graphics, vol. 20, No. 4, ACM, pp. 269-278, 1986.

Kelly et al., "Reactive Nonholonomic Trajectory Generation via Parametric Optimal Control", International Journal of Robotics Research, vol. 22, No. 7-8, pp. 583-601 (Jul. 30, 2013).

(56) References Cited

OTHER PUBLICATIONS

Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." the International journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 37, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passiv rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.

Puwein, J., et al."Robust Multi-view camera calibration for wide-baseline camera networks,"In IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation-A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
Varol Gul et al: "Product placement detection based on image processing", 2014 22nd Signal Processing and Communication Applications Conference (SIU), IEEE, Apr. 4, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

(56) References Cited

OTHER PUBLICATIONS

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Faqade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced Pca-based localization using depth maps with missing data," IEEE, pp. 1-8, Apr. 24, 2013.

Chen et al. "Improving Octree-Based Occupancy Maps Using Environment Sparsity with Application to Aerial Robot Navigation" Robotics and Automation (ICRA), 2017 IEEE.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France. [hal-01097361].

Douillard, Bertrand, et al. "On the segmentation of 3D Lidar point clouds." Robotics and Automation (ICRA), 2011 IEEE International Conference on IEEE, 2011.

Dubois, M., et al., "A comparison of geometric and energy-based point cloud semantic segmentation methods," European Conference on Mobile Robots (ECMR), pp. 88-93, 25-27, Sep. 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Federico Tombari et al. "Multimodal cue integration through Hypotheses Verification for RGB-D object recognition and 6DOF pose estimation", IEEE International Conference on Robotics and Automation, Jan. 2013.

Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).

Glassner, "Space Subdivision for Fast Ray Tracing." IEEE Computer Graphics and Applications, 4.10, pp. 15-24, 1984.

Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).

Ziang Xie et al., "Multimodal Blending for High-Accuracy Instance Recognition", 2013 IEEE RSJ International Conference on Intelligent Robots and Systems, pp. 2214-2221.

\* cited by examiner

METHOD, SYSTEM AND APPARATUS FOR GENERATING NAVIGATIONAL DATA

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

A mobile apparatus may be employed to perform tasks within the environment, such as capturing data for use in identifying products that are out of stock, incorrectly located, and the like. To travel within the environment, a path is generated extending from a starting location to a destination location. Various mechanisms exist to generate paths for use by the apparatus, each of which attempts to balance competing priorities. Examples of such competing priorities include reducing the computational complexity of the path generation to reduce the time required to compute and deploy a path and generating a more efficient (e.g. shorter in terms of distance travelled) and kinematically feasible path. Efficiency and kinematic feasibility typically increase computational complexity and therefore tend to increase the time required to generate and deploy a path for execution at the apparatus.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
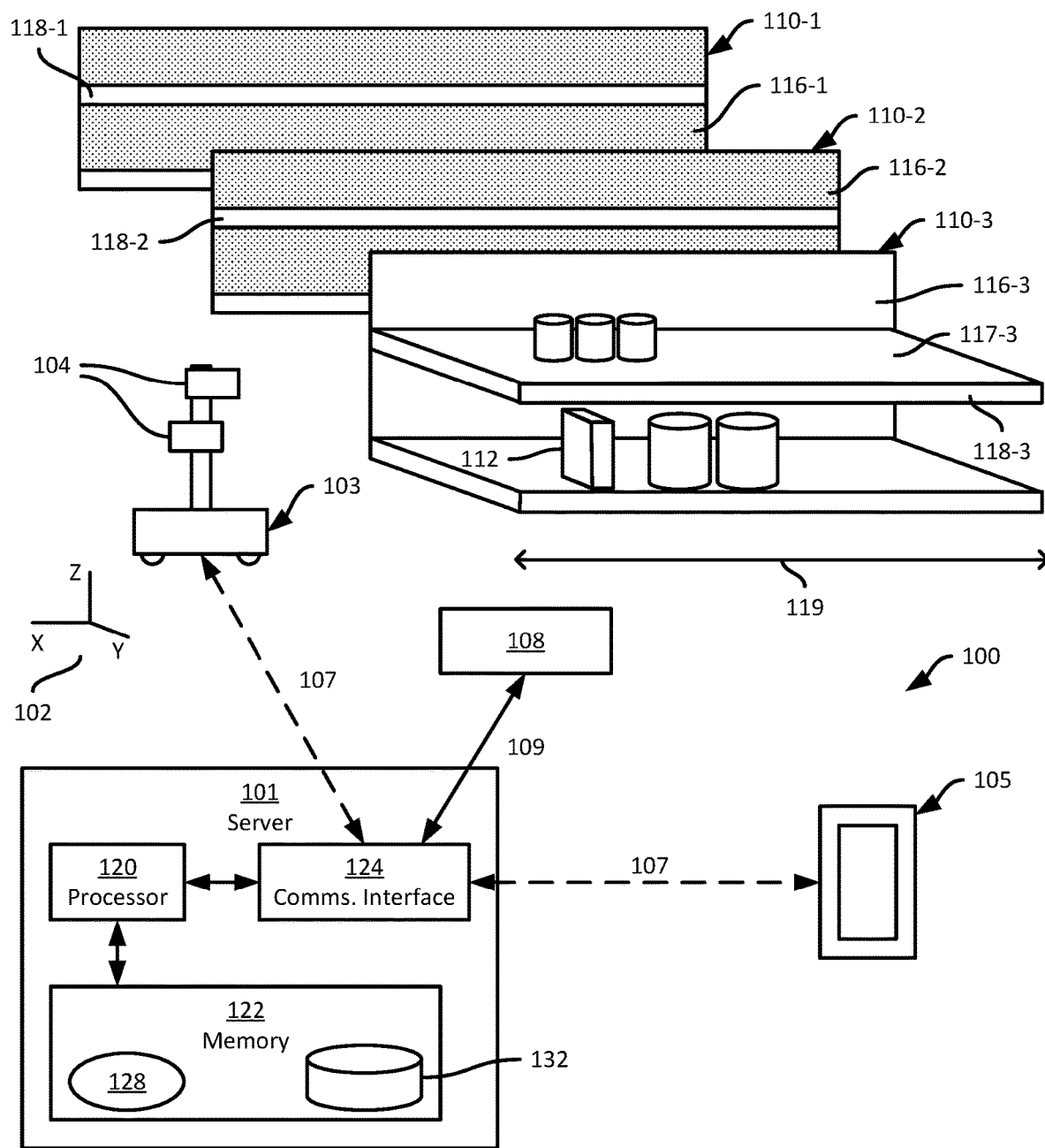
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of generating a navigational path for a mobile automation apparatus, the method comprising: storing, by a navigational controller in a memory, for each of a plurality of pairs of poses having predetermined orientations of the mobile automation apparatus, a group of pre-computed path segments, each path segment in the group traversing the pair of poses and corresponding to one of a set of entry poses and one of a set of exit poses; obtaining, by the navigational controller, a coarse path defined by a sequence of guide poses each having one of the predetermined orientations, the coarse path having a start location and an end location; for each successive pair of the guide poses, retrieving, by the navigational controller, a selected one of the pre-computed path segments from the memory based on the orientations of the pair of guide poses, an orientation of a preceding guide pose, and an orientation of a following guide pose; and generating, by the navigational controller, a final path for navigation by the mobile automation apparatus by combining the selected path segments.

Additional examples disclosed herein are directed to a computing device for generating a navigational path for a mobile automation apparatus, comprising: a memory storing, for each of a plurality of pairs of poses having predetermined orientations, a group of pre-computed path segments, each path segment in the group traversing the pair of poses and corresponding to one of a set of entry poses and one of a set of exit poses; a navigational controller connected to the memory, the navigational controller configured to: obtain a coarse path defined by a sequence of guide poses each having one of the predetermined orientations, the coarse path having a start location and an end location; for each successive pair of the guide poses, retrieve a selected one of the path segments from the memory based on orientations of the pair of guide poses, an orientation of a preceding guide pose, and an orientation of a following guide pose; and generate a final path for navigation by the mobile automation apparatus by combining the selected path segments.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail environment, and communicates with the server 101 (e.g. via the link 107) to navigate, autonomously or partially autonomously, along a length 119 of at least a portion of the shelves 110. As will be described in greater detail below, the apparatus 103 is configured to navigate among the shelves 110 via the generation of a coarse set of guide poses, followed by the generation of a final, finer path based on the guide poses and the execution of the final path by the apparatus 103. The above-mentioned poses and paths may be defined, for example, according to a frame of reference 102 established within the retail environment.

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 and to capture shelf data during such navigation.

The server 101 includes a special purpose navigational controller, such as a processor 120, specifically designed to control and/or assist the mobile automation apparatus 103 to navigate the environment and to capture data. To that end, the server 101 is configured to maintain, in a memory 122 connected with the processor 120, a repository 132 containing data for use in navigation by the apparatus 103.

The processor 120 can be further configured to obtain the captured data via a communications interface 124 for subsequent processing (e.g. to detect objects such as shelved products in the captured data, and detect status information corresponding to the objects). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for performing various functionality, including control of the apparatus 103 to capture shelf data, post-processing of the shelf data, and generating and providing certain navigational data to the apparatus 103, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a path segment generation application 128, which may also be implemented as a suite of logically distinct applications. In general, via execution of the application 128 or subcomponents thereof and in conjunction with the other components of the server 101, the processor 120 is configured to implement various functionality. The processor 120, as configured via the execution of the control application 128, is also referred to herein as the navigational controller 120. As will now be apparent, some or all of the functionality implemented by the navigational controller 120 described below may also be performed by special purpose hardware elements (e.g. one or more FPGAs and/or Application-Specific Integrated Circuits (ASICs) configured to enhance the processing speed of navigational instructions) rather than by execution of the control application 128 by the processor 120.

Figures 2A, 2B:
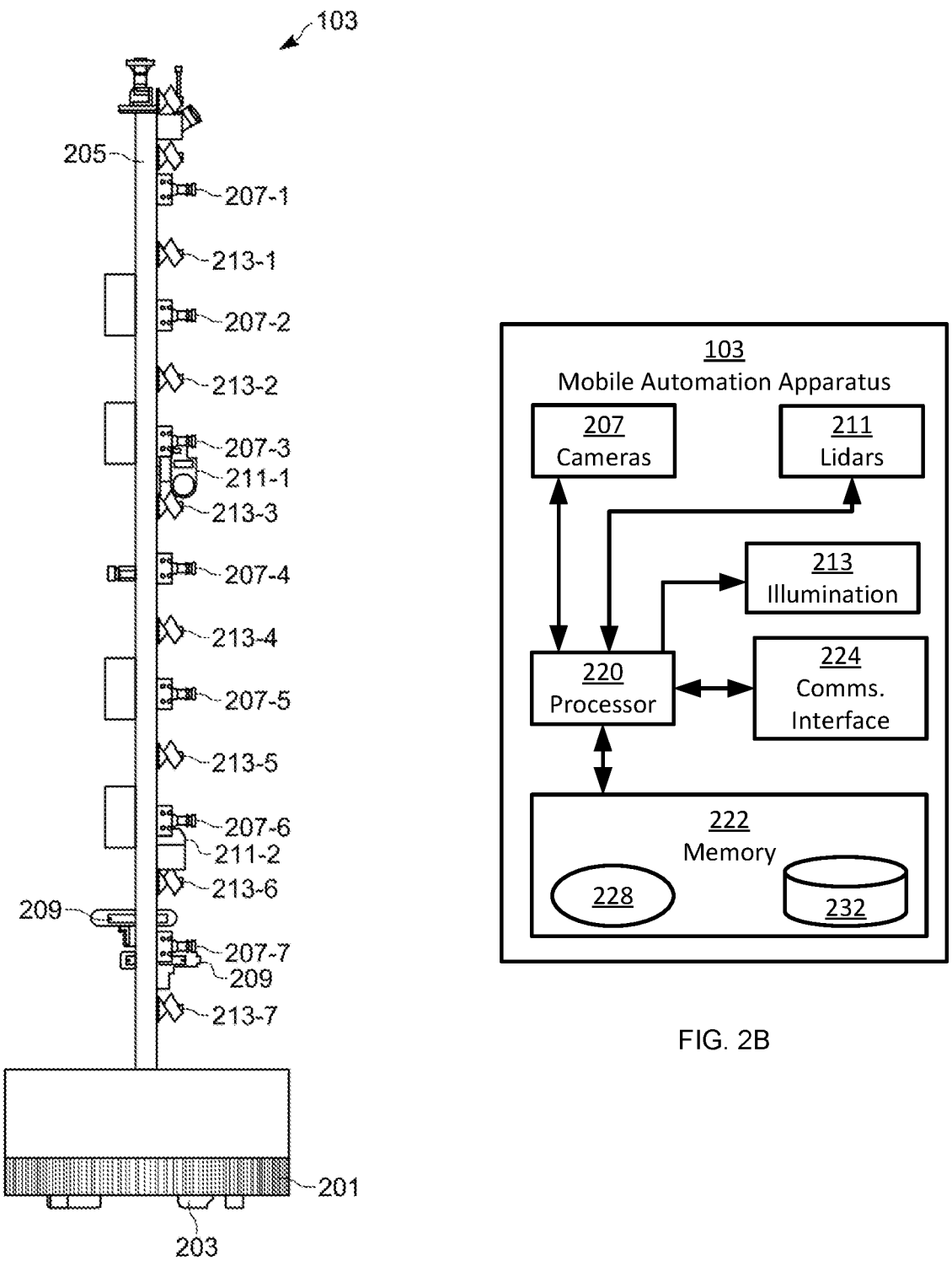
FIG. 2A depicts a mobile automation apparatus in the system of FIG. 1.
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in a common frame of reference previously established in the retail facility, permitting data captured by the mobile automation apparatus to be registered to the common frame of reference.

The mobile automation apparatus 103 includes a special-purpose navigational controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions discussed below in greater detail and related to the navigation of the apparatus 103 (e.g. by controlling the locomotive mechanism 203). The application 228 may also be implemented as a suite of distinct applications in other examples.

The processor 220, when so configured by the execution of the application 228, may also be referred to as a navigational controller 220. Those skilled in the art will appreciate that, in other embodiments, some or all of the functionality implemented by the processor 220 via the execution of the application 228 may alternatively or in addition be implemented by one or more specially designed hardware and firmware components, such as FPGAs and/or ASICs configured to enhance the processing speed of navigational instructions.

The memory 222 may also store a repository 232 containing, for example, a map of the environment in which the apparatus 103 operates, for use during the execution of the application 228. The repository 232 also contains, as will be described below, a plurality of path segments for use in navigation. The apparatus 103 may communicate with the server 101, for example to receive instructions to navigate to specified locations and initiate data capture operations, via a communications interface 224 over the link 107 shown in FIG. 1. The communications interface 224 also enables the apparatus 103 to communicate with the server 101 via the dock 108 and the link 109.

In the present example, as discussed below, the server 101 is configured (via the execution of the application 128 by the processor 120) to generate a plurality of pre-computed path segments. The path segments can be provided to the apparatus 103 for storage in the repository 232, which is then configured (via the execution of the application 228 by the processor 220) to use the path segments to generate navigational paths for execution via control of the locomotive mechanism 203. As will be apparent in the discussion below, in other examples, some or all of the processing performed by the server 101 may be performed by the apparatus 103, and some or all of the processing performed by the apparatus 103 may be performed by the server 101.

Figure 3A:
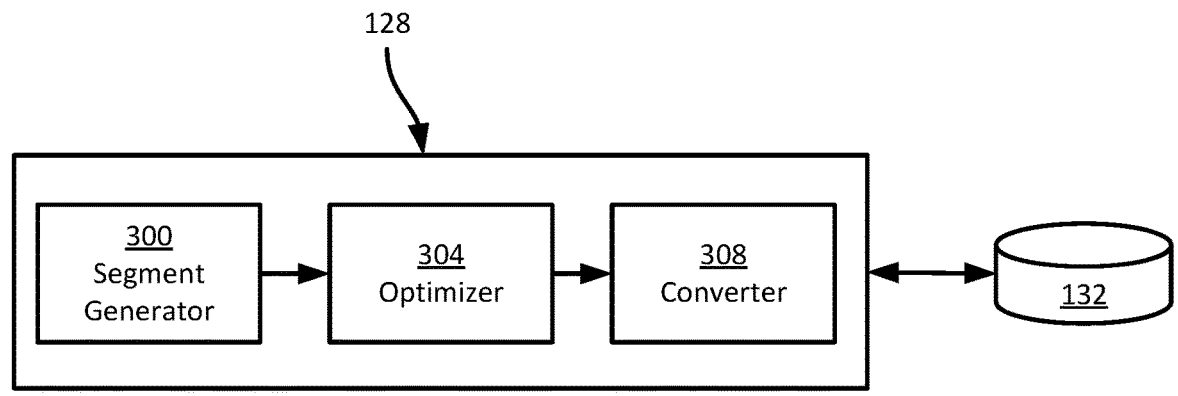
FIG. 3A is a block diagram of certain internal components of the server of FIG. 1.
Figure 3B:
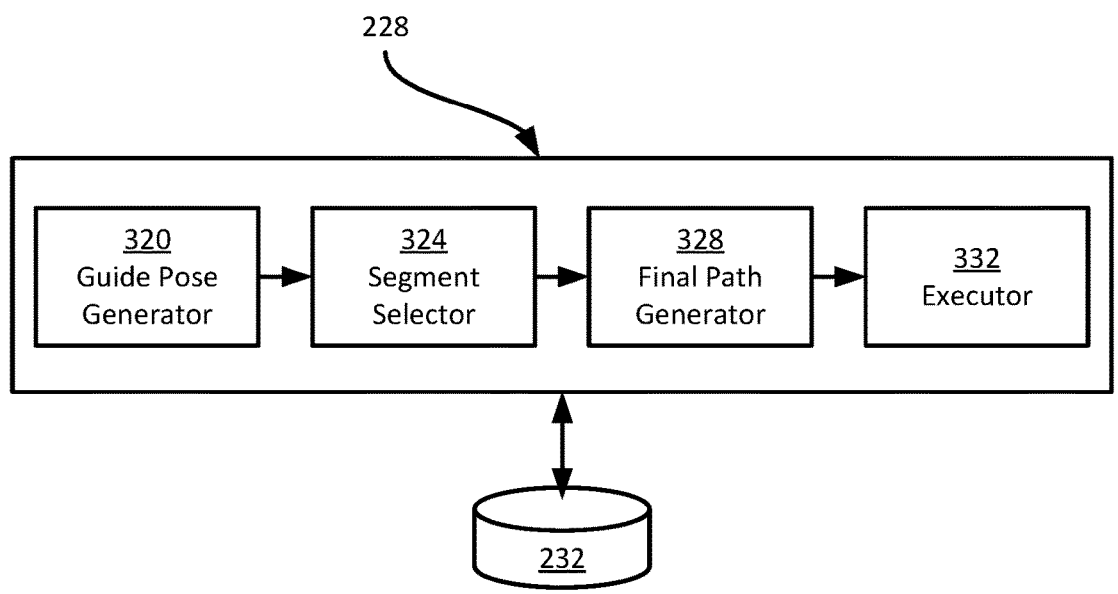
FIG. 3B is a block diagram of certain internal components of the mobile automation apparatus of FIG. 1.

Turning now to FIGS. 3A and 3B, before describing the actions taken by the server 101 and the apparatus 103 to generate navigational data, certain components of the applications 128 and 228 will be described in greater detail. As will be apparent to those skilled in the art, in other examples the components of either or both of the applications 128 and 228 may be separated into distinct applications, or combined into other sets of components. Some or all of the components illustrated in FIGS. 3A and 3B may also be implemented as dedicated hardware components, such as one or more ASICs or FPGAs.

The application 128 includes a segment generator 300 configured to generate a plurality of path segments from sets of input poses. The application 128 also includes an optimizer 304 configured to evaluate the path segments generated by the segment generator 300 and select a subset of the path segments to optimize one or more metrics and satisfy one or more constraints. The application 128 can also include a converter 308, configured to convert the path segments selected by the optimizer 304 into a format suitable for storage in the repository 132 and transmission to the apparatus 103.

The application 228 includes a guide pose generator 320 configured to generate a coarse path for use in navigating from a start location to an end location. The application 228 also includes a segment selector 324, configured to select a set of the path segments generated by the application 128 (and stored in the repository 232 following receipt from the server 101, for example) based on the guide poses from the guide pose generator 320. The application 228 further includes a final path generator 328 configured to generate a final path (typically with a finer spacing between poses than the coarse path) from the segments selected by the selector 324. The application 228 can also include an executor 332 configured to control the locomotive mechanism 203 to travel along the final path from the generator 328.

The functionality of the applications 128 and 228 will now be described in greater detail. In particular, the generation of path segments for provision to the apparatus 103 will be described as performed by the server 101, while the generation of a coarse path and construction of a final path using the coarse path and the above-mentioned segments will be described as performed by the apparatus 103.

Figure 4:
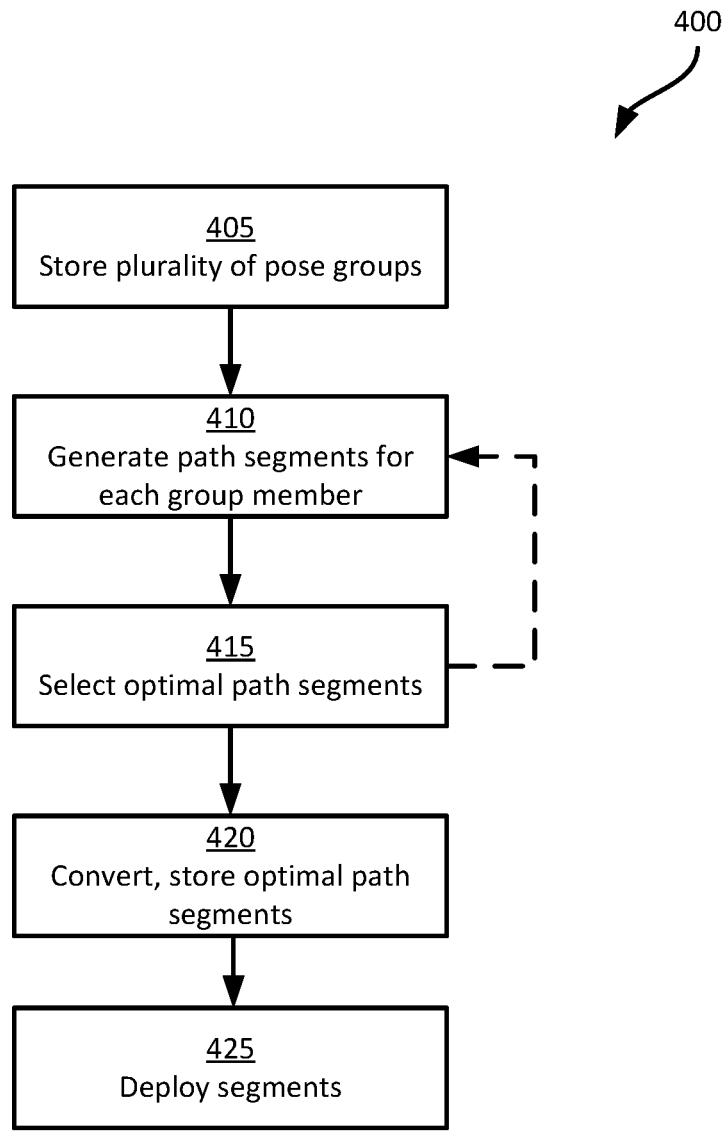
FIG. 4 is a flowchart of a method for generating navigational data at the server of FIG. 1.

Turning to FIG. 4, a method 400 of generating path segments is shown. The method 400 will be described in conjunction with its performance by the server 101, with reference to the components illustrated in FIG. 3A.

At block 405, the server 101 is configured to store a plurality of pose groups. As will be apparent to those skilled in the art, the term "pose" refers to a position and an angle of orientation. In the present example, poses generated by the apparatus 103 for navigation among the shelves 110 may be defined by positions in the predefined frame of reference 102 in the retail environment. In the present example, as shown in FIG. 1, the frame of reference 102 has an X-Y plane parallel to the floor along which the apparatus 103 travels, and a Z axis perpendicular to the floor. The apparatus 103 is ground-based in the present example, and poses are therefore defined by a position expressed in X, Y coordinates and an orientation expressed for example as an angle relative to the X axis.

The poses in the pose groups mentioned above, however, need not have absolute positions defined according to the above-mentioned frame of reference. Instead, in the present example the poses stored at block 405 have relative positions. The relative positions are defined in the frame of reference 102, for example with the first pose of the pair having a null position, and the second pose of the pair having a position defined as an increment in each of the X and Y directions. The magnitude of the increment is predefined in the present example, according to a predetermined spacing between guide poses generated by the apparatus 103.

Each pose group stored at block 405 includes a plurality of pose sequences (that is, each sequence is a member of the group). Each group member sequence includes a pair of active poses, as well as an entry (also referred to as parent) pose and an exit (also referred to as child) pose. As will be discussed below in greater detail, the server 101 is configured to generate a path segment for the pair of active poses, taking into account the parent pose and the child pose. That is, different path segments may be generated for the same pair of active poses, according to the orientations and positions of the associated entry and exit poses in the member sequence. Of particular note, all member sequences of each pose group share the same pair of active poses.

Figure 5A:
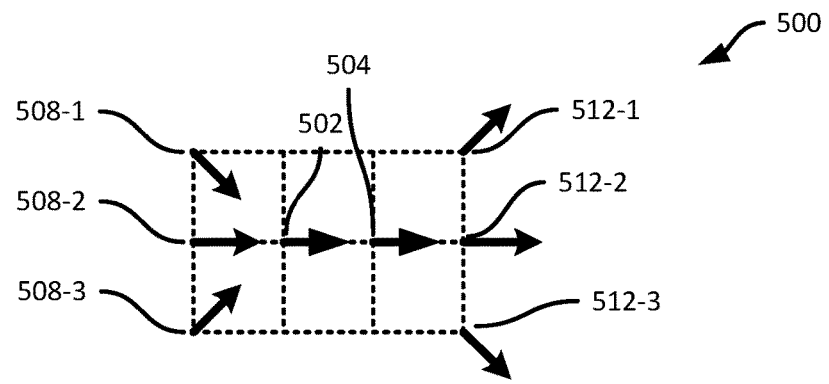
FIGS. 5A and 5B depict an example pose group employed in the generation of navigational data in the method of FIG. 4.
Figure 5B:
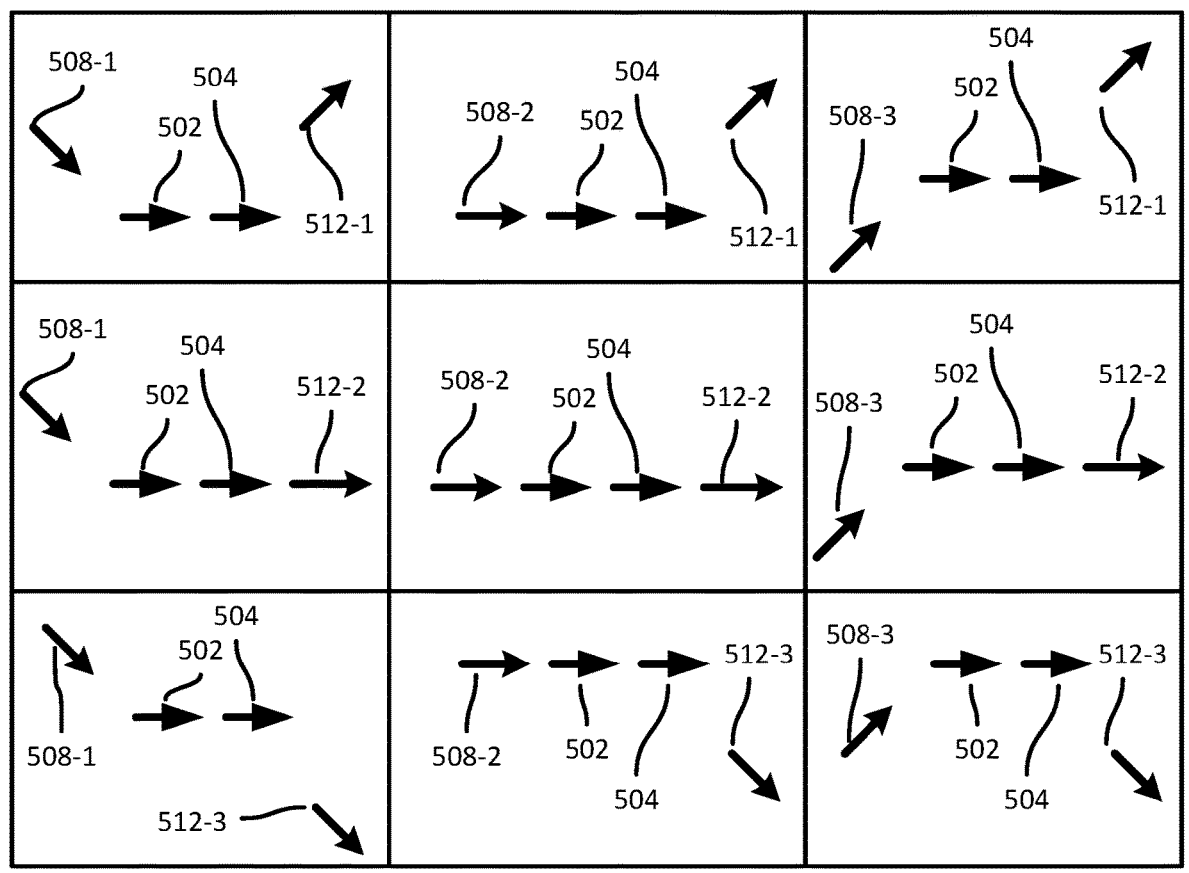

Turning to FIG. 5A, an example pose group 500 is illustrated. The pose group includes a shared pair of active poses, 502 and 504 (i.e. active poses 502 and 504 are common to all members of the pose group 500). In addition, the pose group 500 includes a total of nine member sequences, each beginning with one of three entry poses 508-1, 508-2 and 508-3 and terminating with one of three exit poses 512-1, 512-2 and 512-3. FIG. 5B illustrates the nine member sequences individually, illustrating the commonality of the active poses 502 and 504 among the member sequences.

The orientations of the poses shown in FIGS. 5A and 5B, as well as the orientations of the associated entry and exit poses, are predefined according to the capabilities of the apparatus 103. In the present example, the guide poses generated by the apparatus 103 each have one of eight available orientations. Specifically, the eight available orientations are multiples of 45 degrees (i.e. 0, 45, 90, 135, 180, 225, 270, and 315 degrees). Further, the maximum angular displacement between adjacent guide poses in the present example is 45 degrees. In other examples, another suitable set of orientations may be employed (e.g. multiples of 10 degrees, with a maximum angular displacement of 30 degrees).

The server 101 is configured, at block 405, to receive and store a plurality of pose groups representing each possible pair of active poses as well as each possible entry and exit pose combination for the active poses. Thus, in the present example (in which orientations are multiples of 45 degrees and the maximum angular displacement between poses is 45 degrees), the server 101 is configured to store a total of 216 member sequences, divided into 24 groups each having 9 member sequences.

At block 410, the server 101 (in particular, the segment generator 300) is configured to generate a plurality of path segments from the pose groups. In the present example, each path segment is generated as a spline (i.e. a curve extending from the null position of the first active pose to the position of the second active pose). More specifically, the generator 300 is configured to generate a plurality of splines for each group member. Thus, for example, the generator 300 is configured to generate a plurality of splines for the group member consisting of the poses 508-1, 502, 504 and 512-1 (the top-left member sequence in FIG. 5B). Each of the splines is generated by selecting (e.g. randomly or according to another suitable generation mechanism) spline parameters, such as coefficients for each of a first, second and third order component of a spline equation, along with a constant value.

At block 415 the server is configured to select, for each member sequence (i.e. for each of the above-mentioned 216 member sequences mentioned above for the present example), a single path segment that satisfies one or more constraints and that optimizes one or more predefined metrics. Various constraints may be applied to the path segments. In the present example, the selected splines are required to traverse the positions of the active pair of poses. The selected splines may also be required, when traversing the positions of the active pair of poses, to have orientations substantially equal to the orientations of the active pair of poses (e.g. within ten percent of the orientations of the active pair of poses).

Further, certain combinations of the selected splines are required to have starting and ending curvatures (i.e. rates of change of orientation) that match one another. More specifically, the splines selected at block 415 are to be used, as will be discussed below, in generating a final path for execution by the apparatus 103. To ensure that the final path is kinematically feasible for the apparatus 103 (i.e. does not impose movements on the apparatus 103 that the locomotive mechanism 203 is not capable of performing), the final path preferably minimizes the occurrence of discontinuities such as changes in orientation greater than a threshold from one pose to the next. Because the final path is constructed from combinations of the splines selected at block 415, the objective above may be implemented as a constraint requiring the curvature and/or the orientation at the end of a first spline to match the curvature and/or the orientation at the beginning of any spline that is compatible with the first spline (i.e. could be combined with the first spline without violating to the maximum angular displacement mentioned above).

In addition to the constraints noted above, an optimization metric may be generated for either or both of the individual splines selected at block 410, and the entire set of (e.g. 216) splines selected at block 415. The metric can include, for example, an integral of the curvature of each spline. Greater curvature integrals typically indicate less efficient splines, which would require the apparatus 103 to travel a greater distance to navigate between poses than a spline or set of splines with a smaller curvature integral. Other optimization metrics are also contemplated, such as the total length of the set of splines.

Figure 6A:
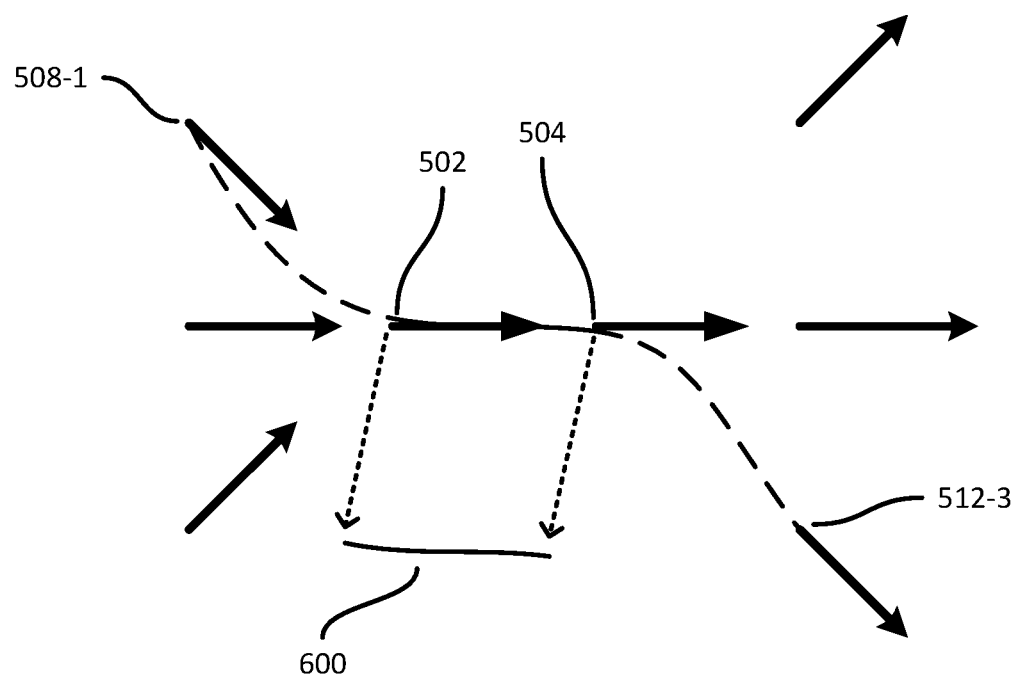
FIGS. 6A and 6B depict example path segments generated in the method of FIG. 4.
Figure 6B:
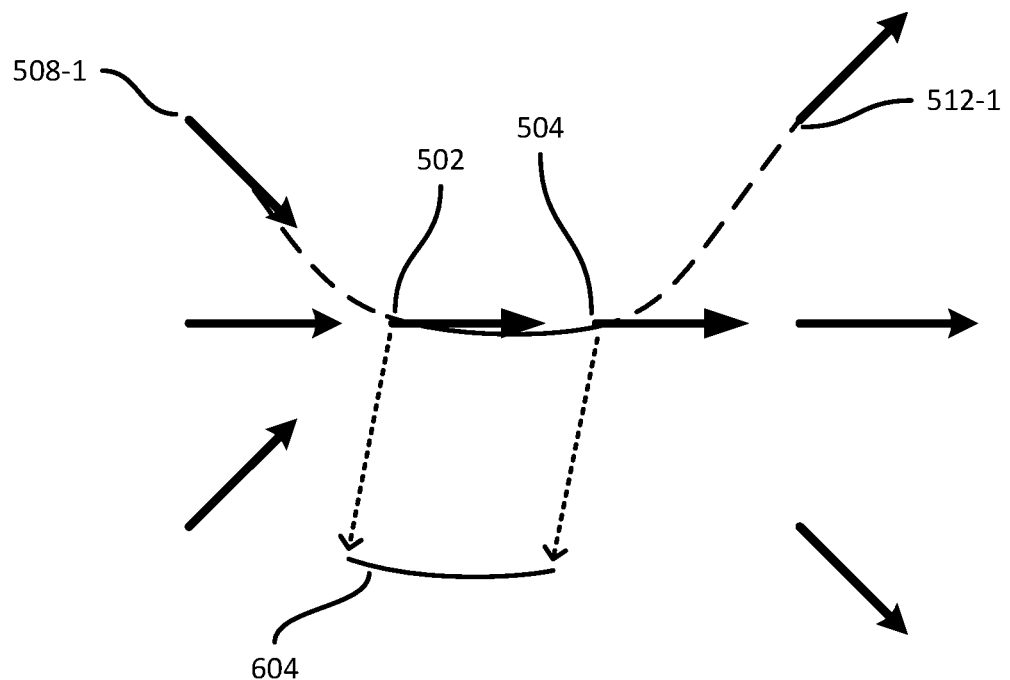

FIGS. 6A and 6B illustrate example splines generated via the process described above. In particular, FIG. 6A illustrates a spline 600 extending between the active poses 502 and 504, with the entry pose 508-1 and the exit pose 512-3. FIG. 6B, meanwhile, illustrates a spline 604 extending between the same active poses 502 and 504, with the entry pose 508-1 and the exit post 512-1. As seen in FIGS. 6A and 6B, the splines generated for the same pair of active poses 502 and 504 differ based on the corresponding entry and exit poses 508 and 512. As also shown in FIGS. 6A and 6B, the splines 600 and 604 may be generated as segments of splines extending from the relevant one of the entry poses 508 to the relevant one of the exit poses 512.

The generation of candidate splines and selection of optimal splines at blocks 410 and 415 can be iterated, as indicated by the dashed line in FIG. 4, if necessary. For example, the performance of blocks 410 and 415 can be iterated until a set of splines is selected at block 415 that satisfies the above-mentioned constraints and for which the optimization metric satisfies a predetermined threshold.

Figure 7:
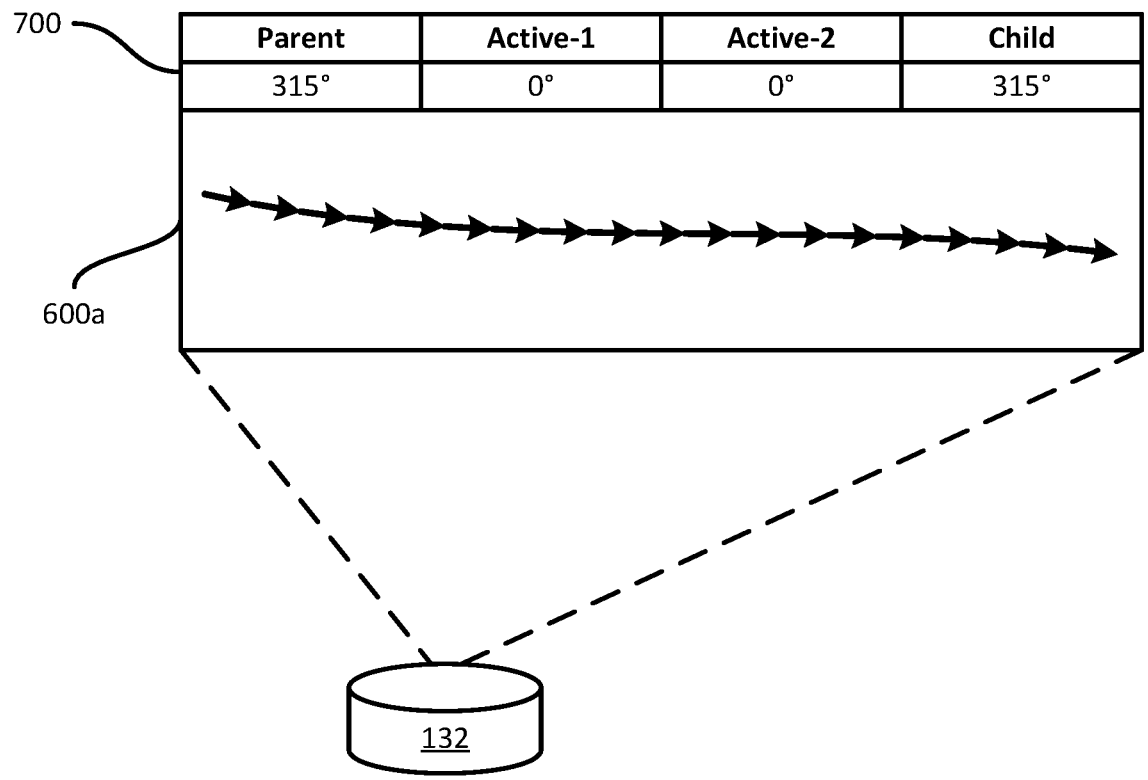
FIG. 7 depicts a converted path segment generated in the method of FIG. 4.

When an optimized set of splines has been selected at block 415, at block 420 the converter 308 is configured to convert the splines selected at block 415 into a format suitable for storage and deployment to the apparatus 103. For example, when the splines are portions of longer splines such as those illustrated in FIGS. 6A and 6B, the converter 308 is configured to extract the splines (e.g. 600 and 604) themselves. In addition, the converter 308 is configured, in the present example, to convert each spline into a series of poses, which may be represented by positions defined as increments according to the frame of reference 102 (e.g. with the first pose having a position of (0,0)). Turning to FIG. 7, an example of the conversion of the spline 600 into a series 600a of poses is shown via the performance of block 420. Although the series 600a is shown graphically in FIG. 7, the series 600a may instead be stored in the repository 132 as a series of parameters defining each pose (e.g. an angle of orientation, an X coordinate and a Y coordinate). The series 600a is stored in the repository 132 along with a segment descriptor 700, indicating the active poses (both 0 degrees in the example of FIG. 7) as well as the entry and exit poses (both 315 degrees in the example of FIG. 7) corresponding to the series 600a.

At block 425, the server 101 is configured to deploy the segments stored in the repository 132, for example by transmitting the segments to the apparatus 103 via the links 107 or 109.

Figure 8:
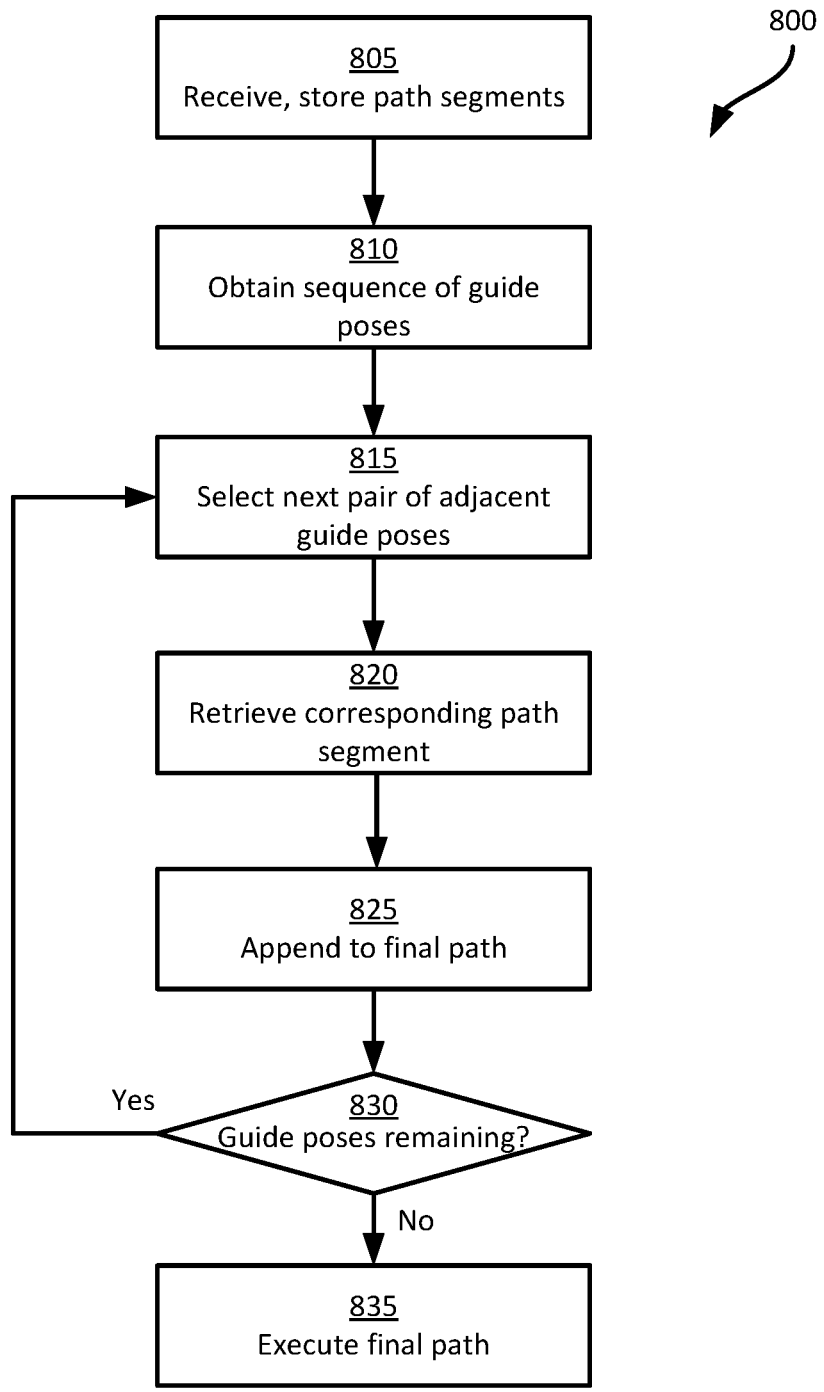
FIG. 8 depicts a method for generating navigational data at the mobile automation apparatus of FIG. 1.

Once the path segments have been deployed to the apparatus 103, the apparatus 103 is configured to employ the path segments in the generation of a final path for execution via control of the locomotive mechanism 203. Turning to FIG. 8, a method 800 of generating a final path is shown. The method 800 will be described in conjunction with its performance by the apparatus 103, with reference to the components illustrated in FIG. 3B.

At block 805, the apparatus 103 is configured to receive and store the path segments as described above. For example, the path segments (e.g. 216 segments, in the present example) may be received via the link 107 or 109 in the format shown in FIG. 7 and stored in the repository 232.

Figure 9:
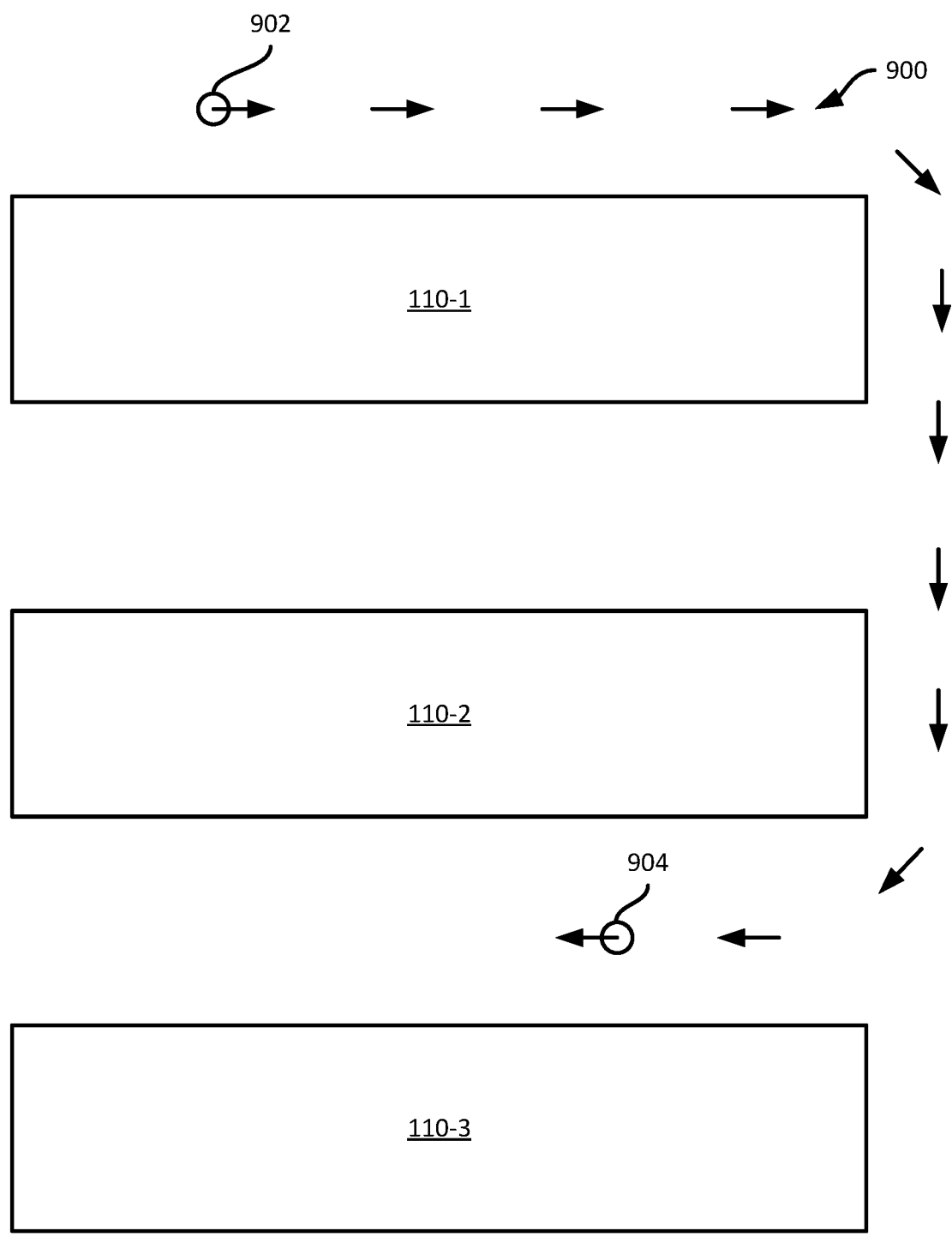
FIG. 9 depicts a set of guide poses generated in the method of FIG. 8.

At block 810, the apparatus 103 is configured to obtain a sequence of guide poses. As noted earlier, the guide poses form a coarse path (i.e. are more spaced apart in the frame of reference 102 than is required of the poses in a final path), and are limited to orientations defined as multiples of 45 degrees. The sequence of guide poses obtained at block 810 is generated at the apparatus 103, by the guide pose generator 320 in the present example. Various processes for generating the guide poses will occur to those skilled in the art. Referring to FIG. 9, a series 900 of twelve guide poses is illustrated forming a coarse path extending from a starting location 902 to an end location 908. For example, the series 900 may have been generated by the apparatus 103 responsive to an instruction from the server 101 to travel to the end location 904 to begin a data capture operation. The starting location 902 may correspond to the current location of the apparatus 103.

Returning to FIG. 8, at block 815 the apparatus 103 (specifically, the segment selector 324) is configured to select the next pair of adjacent guide poses for processing. Thus, in the present example performance of the method 800, the selector 324 is configured to select the first and second poses of the series 900. At block 820, the selector 324 is configured to retrieve, from the repository 232, one of the pre-computed path segments received at block 805 that corresponds to the selected pair of adjacent guide poses. The retrieval at block 820 is based not only on the selected pair of guide poses themselves, but also on the preceding guide pose and the following guide pose. Thus, for the first and second poses of the series 900, the preceding guide pose must be assumed, as the series 900 does not include any poses before the starting location 902. The following pose is the third pose in the series 900.

As discussed earlier, the path segments received at block 805 include a group of segments for each pair of poses, with each segment in the group corresponding to a particular sequence that includes the pair of poses as well as the entry pose and the exit pose. The selector 324 is configured to retrieve the group member that corresponds to the set of entry pose, active pose pair, and exit pose, selected from the series 900. Thus, in connection with the first two poses of the series 900, the selector 324 is configured to retrieve from the repository 232 the path segment with a descriptor indicating that the entry pose, active poses, and exit pose are all zero degrees.

Responsive to retrieval of the relevant path segment at block 820, the final path generator 328 is configured to append the selected path segment to a final path at block 825. Appending a retrieved path segment to the final path also includes assigning a final position to the poses contained in the retrieved path segment. As noted above, the path segments as received from the server 101 may include poses with positions defined relative to the null position of a first segment pose. Thus, appending a path segment to the final path can include replacing the null position of the first pose in the segment with a location in the frame of reference that follows the current end of the final path. The coordinates of that location are also added to the increments defining each of the remaining poses in the segment, to generate final coordinates for the poses.

Figure 10:
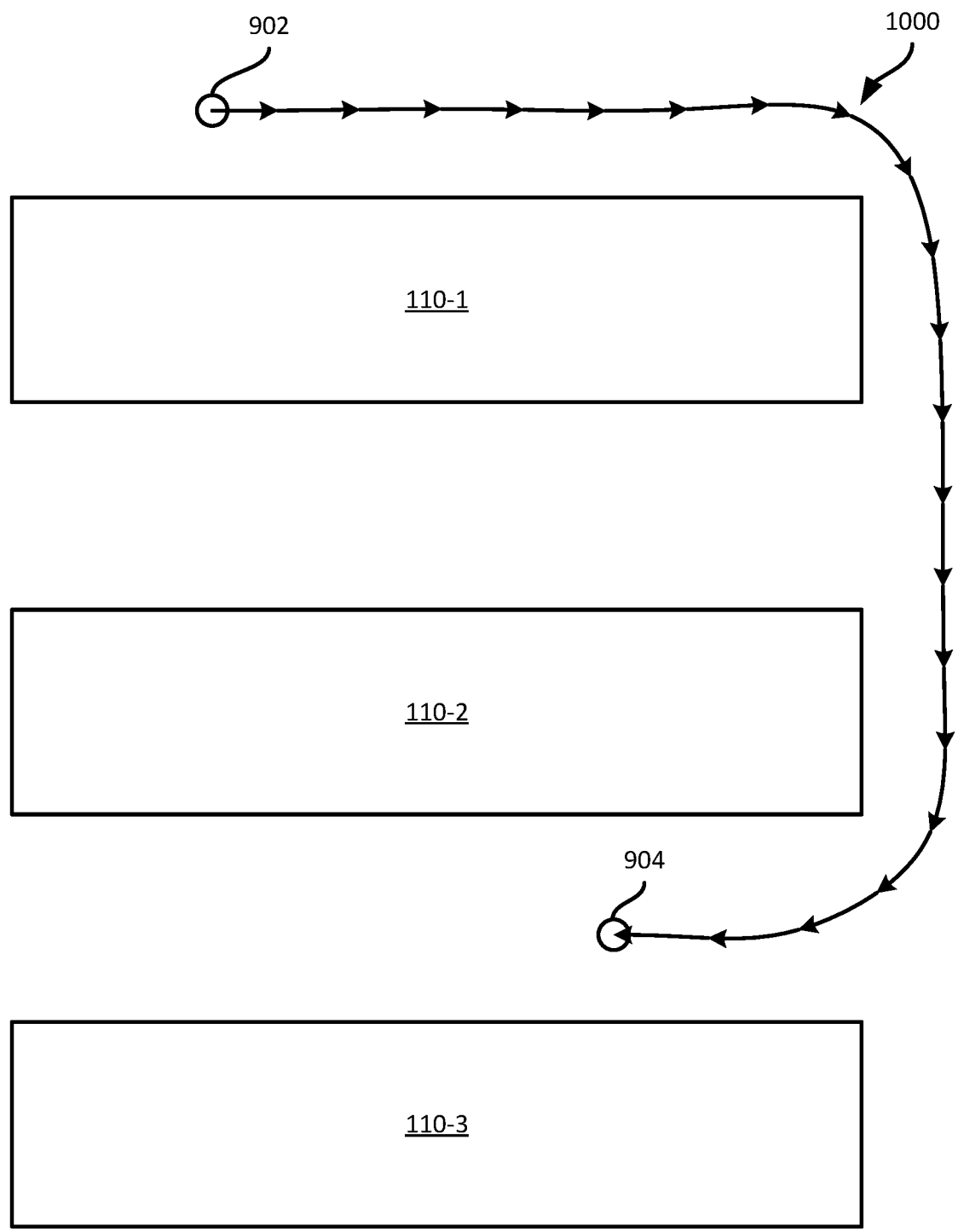
FIG. 10 depicts a final path generated in the method of FIG. 8.

The apparatus 103 is then configured to determine whether any guide poses remain to be processed at block 830. When the determination is affirmative, the performance of blocks 815 to 830 are repeated for the next pair of adjacent guide poses (e.g. the second and third guide pose in the series 900). When the determination at block 830 is negative, the final path is complete. Referring to FIG. 10, an example final path 1000 is shown, defined by a plurality of poses spaced at finer intervals than the guide poses in the series 900, and corresponding to the pre-computed poses for eleven splines retrieved from the repository 232. Responsive to completion of the final path at block 830, the apparatus 103 proceeds to block 835. At block 835, the executor 332 is configured to control the locomotive mechanism 203 to travel along the final path from the starting location 902 to the end location 904.

Variations to the above systems and methods are contemplated. For example, although the path segments are described above as being generated at the server and deployed to the apparatus 103, in other examples the apparatus 103 may be configured to perform the pre-computation of the path segments itself, for subsequent use in generated one or more final paths. It is also contemplated that various other mechanisms for pre-computing the path segments can be deployed at either or both of the server 101 and the apparatus 103. For example, rather than generating a plurality of segments and selecting among those segments to optimize various metrics, the segment generator 300 and the optimizer 304 can be configured to generate the path segments by updating the above-mentioned spline parameters to determine parameters that result in local minima for the optimization metrics. In further examples, the server 101 may not only generate the pre-computed path segments, but also retrieve specific path segments from the repository 132 and provide the path segments to the apparatus 103. For example, the apparatus 103 may be configured to transmit a series of segments descriptors generated from the guide poses to the server, to request the corresponding path segments.

In further examples, the path segments may be generated based on additional levels of poses, beyond the entry and exit poses discussed above. For example, grandparent and grandchild poses may be accounted for in the generation of path segments by the server 101 (i.e. each member sequence may include six poses instead of the four mentioned above).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of generating a navigational path for a mobile automation apparatus, the method comprising:
   storing, by a navigational controller in a memory, for each of a plurality of pairs of poses having predetermined orientations of the mobile automation apparatus, a group of pre-computed path segments, each path segment in the group traversing the pair of poses and corresponding to one of a set of entry poses and one of a set of exit poses;

obtaining, by the navigational controller, a coarse path defined by a sequence of guide poses each having one of the predetermined orientations, the coarse path having a start location and an end location;

for each successive pair of the guide poses, retrieving, by the navigational controller, a selected one of the pre-computed path segments from the memory based on the orientations of the pair of guide poses, an orientation of a preceding guide pose, and an orientation of a following guide pose; and generating, by the navigational controller, a final path for navigation by the mobile automation apparatus by combining the selected path segments.

2. The method of claim 1, wherein storing the pre-computed path segments includes receiving the pre-computed path segments from a server.

3. The method of claim 1, wherein each pre-computed path segment is stored with a descriptor identifying the orientations of the pair of poses, the entry pose, and the exit pose.

4. The method of claim 1, wherein retrieving the selected path segment for each pair of adjacent guide poses includes retrieving the path segment having a descriptor matching the pair of guide poses, a preceding guide pose, and a following guide pose.

5. The method of claim 1, wherein the pre-computed path segments are splines.

6. The method of claim 1, wherein storing the pre-computed path segments includes storing a plurality of final poses for each of the pairs of poses.

7. The method of claim 6, wherein storing the pre-computed path segments further comprises storing relative positions for each of the final poses; and wherein generating the final path comprises converting the relative positions into absolute positions according to a frame of reference.

8. The method of claim 1, further comprising:
controlling a locomotive mechanism to navigate the final path.

9. A computing device for generating a navigational path for a mobile automation apparatus, comprising:

a memory storing, for each of a plurality of pairs of poses having predetermined orientations, a group of pre-computed path segments, each path segment in the group traversing the pair of poses and corresponding to one of a set of entry poses and one of a set of exit poses;

a navigational controller connected to the memory, the navigational controller configured to:

obtain a coarse path defined by a sequence of guide poses each having one of the predetermined orientations, the coarse path having a start location and an end location;

for each successive pair of the guide poses, retrieve a selected one of the path segments from the memory based on orientations of the pair of guide poses, an orientation of a preceding guide pose, and an orientation of a following guide pose; and generate a final path for navigation by the mobile automation apparatus by combining the selected path segments.

10. The computing device of claim 9, further comprising:
a communication interface connected to the navigational controller;

wherein the navigational controller is further configured to receive, via the communication interface, the pre-computed path segments from a server for storage in the memory.

11. The computing device of claim 9, wherein each pre-computed path segment is stored in the memory with a descriptor identifying the orientations of the pair of poses, the entry pose, and the exit pose.

12. The computing device of claim 9, wherein the navigational controller is further configured to retrieve the selected path segment for each pair of adjacent guide poses by: retrieving, from the memory, the path segment having a descriptor matching the pair of guide poses, a preceding guide pose, and a following guide pose.

13. The computing device of claim 9, wherein the pre-computed path segments are splines.

14. The computing device of claim 9, wherein the memory further stores a plurality of final poses for each of the pairs of poses.

15. The computing device of claim 14, wherein the memory further stores relative positions for each of the final poses; and wherein the navigational controller is further configured to generate the final path by converting the relative positions into absolute positions according to a frame of reference.

16. The computing device of claim 9, wherein the navigational controller is further configured to control a locomotive mechanism of the mobile automation apparatus to navigate the final path.

* * * * *